United States Patent [19]
Herrington

[11] Patent Number: 4,531,750
[45] Date of Patent: Jul. 30, 1985

[54] LAYERED GASKET WITH DOUBLE EYELET CONSTRUCTION

[75] Inventor: Maurice G. Herrington, Furnham Common, England

[73] Assignee: Payen International Limited, Slough, England

[21] Appl. No.: 678,757

[22] Filed: Dec. 5, 1984

[30] Foreign Application Priority Data

Dec. 8, 1983 [UK] United Kingdom ............... 8332854

[51] Int. Cl.[3] ............................................ F16J 15/12
[52] U.S. Cl. ..................... 277/235 B; 277/234
[58] Field of Search ............... 277/1, 229, 234, 235 R, 277/235 A, 235 B, 236

[56] References Cited

U.S. PATENT DOCUMENTS

| 1,815,601 | 7/1931 | Victor | 277/235 B X |
| 1,815,602 | 7/1931 | Russell | 277/235 B X |

FOREIGN PATENT DOCUMENTS

| 1151981 | 7/1963 | Fed. Rep. of Germany ... 277/235 B |
| 2736599 | 2/1979 | Fed. Rep. of Germany ... 277/235 B |
| 589670 | 3/1959 | Italy ............................... 277/235 B |

Primary Examiner—Robert S. Ward
Attorney, Agent, or Firm—Cushman, Darby & Cushman

[57] ABSTRACT

A gasket constituted by a flat body portion of gasket material having at least one eyeletted aperture therein, characterized in that the eyelet is a composite one having an inner and outer portion, said portions being so disposed that on one face of the gasket body material, the inner portion projects beyond the outer portion, and that on the other face of the gasket body material, the outer portion projects beyond the inner portion.

3 Claims, 1 Drawing Figure

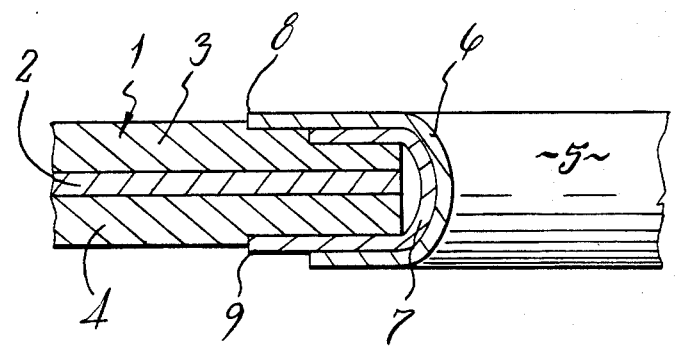

LAYERED GASKET WITH DOUBLE EYELET CONSTRUCTION

FIELD OF THE INVENTION

This invention relates to gaskets of the kind in which a flat sheet of gasket body material has at least one aperture, the margin of which is reinforced by the insertion of a metal eyelet. The eyelet is pressed into place so that its flanges extend over both faces of the body material in the immediate vicinity of the aperture, the margin of which is thereby fully protected against such hostile environments as may be present in the aperture when the gasket is in use.

THE PRIOR ART

The use of eyelets in gaskets is well-known; improved forms of gasket based on specific eyelet constructions are shown in patent GB No. 1260236, for example. The latter is concerned with supporting an all-metal primary sealing ring inside a gasket aperture, by means which themselves constitute a secondary seal around the margin of the aperture in question.

OBJECT OF THE INVENTION

It is an object of the invention to provide a simplified eyeletted gasket construction with both a primary and secondary sealing capability.

DESCRIPTION OF THE INVENTION

According to the present invention a gasket constituted by a flat body portion of gasket material having at least one eyeletted aperture therein is characterised in that the eyelet is a composite one having inner and an portions, said portions being so disposed that on one face of the gasket body material the inner portion projects beyond the outer portion, and on the outer face of the gasket body material, the outer portion projects beyond the inner portion.

The invention thus features what is in effect a double eyelet, but of asymmetrical construction. Preferably, the projecting portions do so by equal amounts so that the overlap onto one face of the gasket body material is matched by a corresponding overlap onto the outer face, (but by a different eyelet portion).

As will be explained later in relation to the accompanying drawing, the result is that in the immediate vicinity of the margin of the aperture there are four eyelet material layers, two on each face of the gasket and also throughout the depth of the aperture. Radially outwardly of the immediate vicinity of the margin of the aperture, there are only two eyelet material layers, each from a different one of the eyelet portions and each on one side only of the gasket. On installation, for example as a cylinder head gasket, the "four layer" region is relatively highly stressed, producing a higher sealing load and therefore a higher pressure sealing capability, in the immediate vincinity of the aperture. The four layer region therefore constitutes a primary sealing zone around the aperture. The "two layer" region is less highly stessed and produces a lower sealing load which enables it to constitute a secondary, or back-up sealing zone around the aperture.

DESCRIPTION OF THE DRAWING

In order that the invention be better understood a preferred embodiment of it will now be described by way of example with reference to the accompanying drawing in which the sole FIGURE is a cross-sectional side view of part of a gasket.

In the FIGURE a gasket 1 comprises a metal core 2 and conventional gasket material facings 3, 4. The gasket has an aperture 5 in it, one margin only of which is shown, fitted with a composite metal eyelet according to the invention. The eyelet comprises an outer portion 6 and an inner portion 7. On facing 3 of the gasket, the outer portion has a projection 8 relative to the inner portion. On the other facing 4, the inner portion 9 projects beyond the outer portion. The relative projections are substantially equal on each side of the gasket.

In use, for example in an internal combustion engine cylinder head gasket where the aperture 5 is a cylinder bore/combustion chamber aperture, the upper face (referring to the drawing) would normally abut against the cylinder head, with the lower face seated against the cylinder block. The overlap/projection 8 serves as protection for the gasket body and that portion of the latter immediately adjacent the outer edge of the inner eyelet portion 7. On the other side of the gasket, the cylinder block provides a degree of protection/support in the region adjacent the aperture, whilst the projection portion 9 of the inner eyelet portion 7 serves as a secondary or back-up seal.

It will be appreciated that the relative thicknesses of the gasket body and the eyelet portions can be adjusted to meet varying requirements. In some cases, the gasket 1 may not have a metal core; the latter may be a plain or pierced sheet. The "double eyelet" assembly of this invention is adaptable to a range of operating conditions.

I claim:

1. A gasket constituted by a flat body portion of gasket material having at least one eyeletted aperture therein, characterised in that the eyelet is a composite one having an inner and outer portion, said portions being so disposed that on one face of the gasket body material, the inner portion projects beyond the outer portion, and that on the other face of the gasket body material, the outer portion projects beyond the inner portion.

2. A gasket according to claim 1 characterised in that the overlap of one projecting portion onto one face of the gasket body material is matched by a corresponding overlap of a different eyelet portion onto the other face.

3. A gasket according to claim 1 characterised in that the gasket body material comprises a plain or pierced metal core with facing layers of gasket material on each side.

* * * * *